US006985512B1

(12) United States Patent
McDermott et al.

(10) Patent No.: US 6,985,512 B1
(45) Date of Patent: Jan. 10, 2006

(54) ASYNCHRONOUS SPREAD-SPECTRUM COMMUNICATIONS

(75) Inventors: Scott A. McDermott, Washington, DC (US); Leif Eric Aamot, Sterling, VA (US)

(73) Assignee: AeroAstro, Inc., Ashburn, VA (US)

( * ) Notice: Subject to any disclaimer, the term of this patent is extended or adjusted under 35 U.S.C. 154(b) by 0 days.

(21) Appl. No.: 09/513,962

(22) Filed: Feb. 28, 2000

(51) Int. Cl.
*H04B 1/707* (2006.01)

(52) U.S. Cl. ....................... 375/147; 375/140; 370/342

(58) Field of Classification Search ................ 375/130, 375/140, 141, 142, 143, 144, 145, 146, 147, 375/148, 149, 150, 151, 152, 153; 370/320, 370/335, 342, 441
See application file for complete search history.

(56) References Cited

U.S. PATENT DOCUMENTS

| | | | | |
|---|---|---|---|---|
| 4,876,737 A | | 10/1989 | Woodworth et al. | 455/20 |
| 4,901,307 A | * | 2/1990 | Gilhousen et al. | 370/320 |
| 5,109,390 A | | 4/1992 | Gilhousen et al. | 370/335 |
| 5,537,397 A | | 7/1996 | Abramson | 370/441 |
| 5,566,168 A | | 10/1996 | Dent | 370/323 |
| 5,668,556 A | | 9/1997 | Rouffet et al. | 342/354 |
| 5,697,050 A | | 12/1997 | Wiedeman | 455/12.1 |
| 5,758,260 A | | 5/1998 | Wiedeman | 455/12.1 |
| 5,790,070 A | | 8/1998 | Natarajan et al. | 342/354 |
| 6,052,561 A | | 4/2000 | Rudowicz et al. | 455/13.1 |
| 6,128,469 A | | 10/2000 | Zenick et al. | 455/12.1 |
| 6,151,313 A | * | 11/2000 | Abramson | 370/342 |
| 6,185,245 B1 | * | 2/2001 | Kim | 375/149 |
| 6,188,682 B1 | | 2/2001 | Takagi et al. | 370/342 |
| 6,205,167 B1 | * | 3/2001 | Kamgar et al. | 375/134 |
| 6,317,029 B1 | | 11/2001 | Fleeter et al. | 340/10.32 |
| 6,339,611 B1 | * | 1/2002 | Antonio et al. | 375/130 |
| 6,373,831 B1 | * | 4/2002 | Secord et al. | 370/342 |
| 6,396,819 B1 | | 5/2002 | Fleeter et al. | 370/320 |
| 6,549,559 B2 | * | 4/2003 | Kamgar et al. | 375/134 |
| 6,574,205 B1 | * | 6/2003 | Sato | 370/335 |

* cited by examiner

*Primary Examiner*—Chieh M. Fan
(74) *Attorney, Agent, or Firm*—Robert M. McDermott, Esq.

(57) ABSTRACT

Communications from autonomous spread-spectrum transmitters are received by dynamically searching the communications band for messages having the same communications parameters, including the use of the same spreading code, but having potentially different code-phases. A receiver that is independent of the transmitters samples the communications band at each code-phase of the spreading code. When a message element is detected at a particular code-phase, the message element is appended to a queue associated with this code-phase. Message elements detected at other code-phases are appended to queues associated with the corresponding code-phases. Gaps between message elements at each code-phase define the beginning and end of each message. In a preferred embodiment of this invention, the processing of the samples occurs at a frequency above the baseband of the encoded message. An FFT processor provides a magnitude and phase associated with each detected message. The magnitude distinguishes message elements from noise elements, and changes in phase determine the bit value associated with each message elements.

16 Claims, 6 Drawing Sheets

FIG. 1 [Prior Art]

ASYNCHRONOUS SPREAD-SPECTRUM COMMUNICATIONS

BACKGROUND OF THE INVENTION

1. Field of the Invention

This invention relates to the field of communications, and in particular to the processing of multiple asynchronous spread-spectrum communications.

2. Description of Related Art

Spread-Spectrum techniques are used to modulate an information signal such that the modulated signal appears as noise. The information is modulated by a pseudo-random signal, and can be demodulated based on a knowledge of the particular pseudo-random sequence used. This modulation is commonly referred to as Direct-Sequence Spread Spectrum (DSSS). The modulated signal is spread across a bandwidth that is substantially larger than the bandwidth of the information signal, and has the apparent effect of increasing the noise-floor of receivers that receive this signal. Knowledge of the pseudo-random sequence allows the information signal to be detected within this apparent noise.

Code Division Multiple Access (CDMA) is a commonly used spread-spectrum communications technique wherein the information signal is encoded by one of many code sequences before it is transmitted. The received signal is decoded by the same code sequence to reproduce the original information signal. Transmissions from multiple transmitters can be simultaneously communicated via a common channel by employing different code sequences for each transmitter, provided that the code sequences have particular uniqueness characteristics. The uniqueness characteristics of acceptable codes substantially guarantee that a coherent output will only be produced when the received signal corresponds to a signal that is encoded using the same code sequence. Signals that are not encoded using the same code sequence as the decoding code sequence are decoded as noise signals. In a conventional CDMA system, such as a cellular telephone network, the network controller allocates and deallocates code sequences on demand, so that each of the transmitters can transmit over the same network without interference from other transmitters.

An often overlooked characteristic of a pseudo-random spread spectrum code is that a coherent output is only produced when the decoding code sequence is applied substantially in phase with the encoding code sequence. Consider, for example, a six-bit code sequence 0-1-1-0-1-0. A one-bit phase shift of this sequence is 1-1-0-1-0-0 (cyclic shift to the left); a two-bit phase shift is 1-0-1-0-0-1; and so on. A six-bit code has six different "code-phases". If the received signal is decoded with a code-phase that corresponds to an encoding phase shifted by two bits, for example, this would be equivalent to receiving a signal having a 1-0-1-0-0-1 encoding sequence and decoding it with a 0-1-1-0-1-0 sequence. If this six-bit code is a proper pseudo-noise code, having the above defined uniqueness characteristics, then the decoding of this signal having a "different" encoding code merely produces a noise output. U.S. Pat. No. 5,537,397, "SPREAD ALOHA CDMA DATA COMMUNICATIONS", issued Jul. 16, 1996, to Norman Abramson, and incorporated by reference herein, discloses a technique that uses this phase-dependency characteristic to allow multiple transmitters to use the same code concurrently. As in the conventional CDMA system, the network controller provides an allocation to each transmitter, but in the referenced patent, each transmitter is allocated a different time-slot, or code-phase, rather than a different code. The controller instructs each transmitter to advance or delay its transmission, so that its signal is received at the receiver with a code-phase that is sufficiently different from the code-phase of other transmitters. In this manner, although each of the transmitters and the receiver use the same code, each transmitter provides a "different" (phase-shifted) code to the receiver, relative to the particular code-phase of the decoder at the time of decoding.

The prior art pseudo-random spread spectrum approaches require a unique identification of each transmitter, because the communication of each allocated code or code-phase must be directed to the appropriate transmitter. Each transmitter must also be equipped with a receiver, to receive and process the communicated code or phase allocation. The code-phase allocation technique also requires that each transmitter have identical encoding frequencies with the receiver, because a difference in frequency between a transmitter and receiver exhibits itself as a continually changing phase shift. As discussed further below, this requirement for substantially identical frequencies extends to the modulation frequency used to up-convert and down-convert to and from a communication radio frequency (RF). This equivalence in frequency can be achieved via the use of a phase locked loop that adjusts the receiver's frequency to the transmitter's. As would be evident to one of ordinary skill in the art, this approach requires a separate phase locked loop for each currently active transmitter.

U.S. Pat. No. 6,396,819, "LOW-COST SATELLITE COMMUNICATION SYSTEM", issued 28 May 2002, and U.S. Pat. No. 6,128,469, "SATELLITE COMMUNICATION SYSTEM WITH A SWEEPING HIGH-GAIN ANTENNA", issued 3 Oct. 2000, to Richard Fleeter, John Hanson, Scott McDermott, and Ray Zenick, and U.S. Pat. No. 6,317,029. "IN SITU REMOTE SENSING", issued 13 Nov. 2001 to Richard Fleeter, disclose systems and methods that facilitate the reception and processing of messages from a large number of preferably low-cost transmitters, and are each incorporated by reference herein. For example, a large number of IC chip-size transmitters may be released from an aircraft that overflies a hurricane or forest fire. These transmitters may be configured to periodically or randomly transmit their location and the atmospheric conditions at their location, such as temperature, pressure, moisture content, and so on. A receiving system receives and processes the transmissions from these many devices and provides temperature and pressure profiles, changes and trends, predictions, and the like. Such systems require simple, low-cost, and efficient transmitters.

BRIEF SUMMARY OF THE INVENTION

It is an object of this invention to provide a multiple-access communication system that allows the use of relatively simple and low-cost transmitters. It is a further object of this invention to provide a multiple-access communication system that allows the use of autonomous transmitters that operate independent of the receiver system of the multiple-access communication system. It is a further object of this invention to provide a multiple-access communication system that allows the use of substantially identical transmitters in a multiple-access communication system.

These objects and others are achieved by providing a method and system that dynamically searches the communications band for transmissions of messages having the same communications parameters, including the use of the same spreading code, but having potentially different code-phases. A receiver that is independent of the transmitters samples the communications band at each code-phase of the spreading code. When a message element is detected at a particular code-phase, the message element is appended to a queue associated with this code-phase. Message elements detected at other code-phases are appended to queues associated with the corresponding code-phases. Gaps between message elements at each code-phase define the beginning and end of each message. In a preferred embodiment of this invention, the processing of the samples occurs at a frequency above the baseband of the encoded message. An FFT processor provides a magnitude and phase associated with each detected message. The magnitude distinguishes message elements from noise elements, and changes in phase determine the bit value associated with each message elements.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
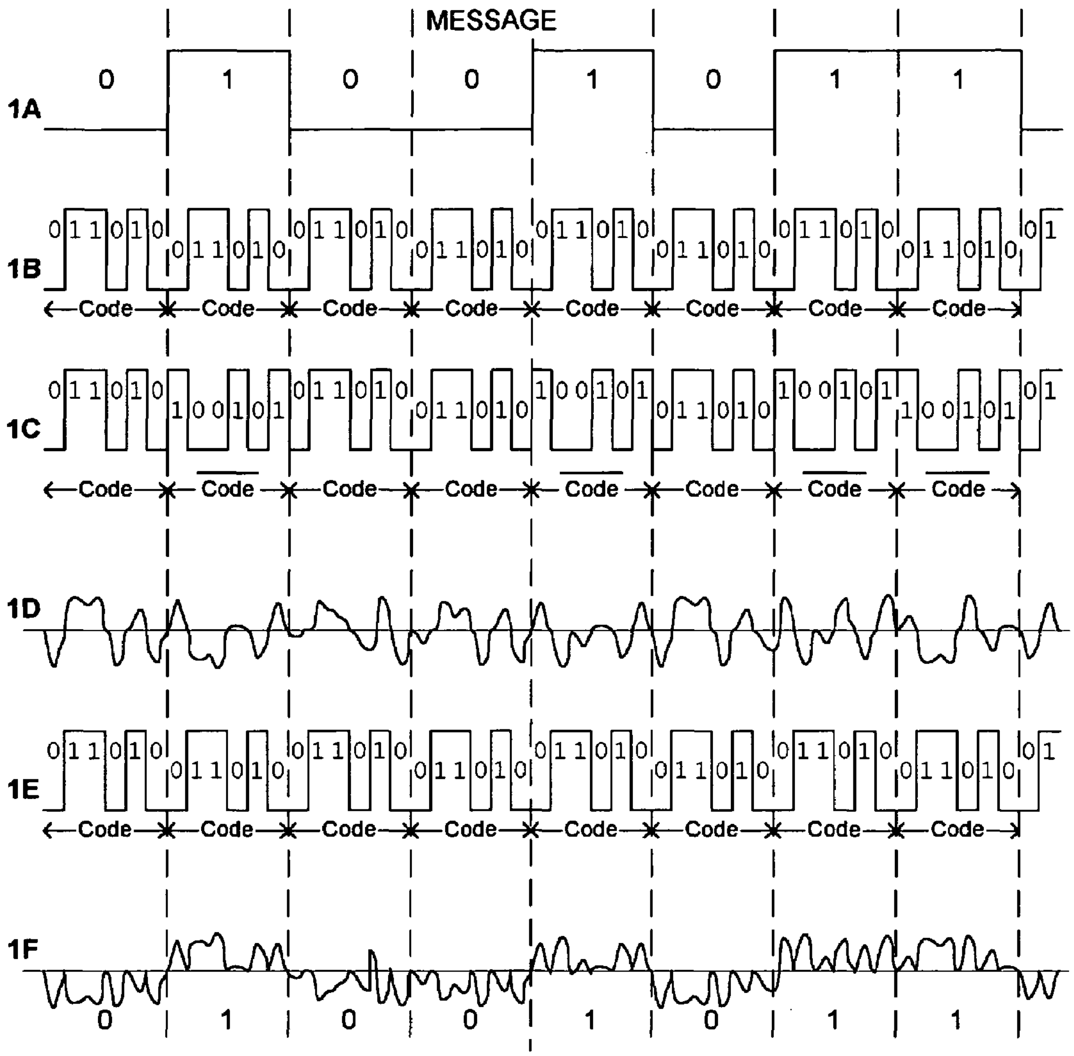
FIG. 1 illustrates an example timing diagram for an encoding and decoding process using an example six-bit spreading-code.

FIG. 1 illustrates an example timing diagram for an encoding and decoding process using an example spreading-code. Illustrated at 1A is a message sequence, consisting of an example 01001011 bit pattern. Illustrated at 1B is a code sequence, consisting of an example 011010 code pattern that is applied to each code-phase of the message. Although the example code comprises six bits, conventional codes use hundreds or thousands of bits. The timing diagram at 1C illustrates the combination of the example 011010 code being applied to each bit in the 01001011 message bit pattern. In this example, the encoding is an exclusive-or of the corresponding bits. That is, if the message bit is zero, the corresponding output is equal to the example code 011010; if the message bit is a one, the corresponding output is equal to the inverse of the code, 100101. As can be seen, this multiplexing of the message bits at 1A and the code at 1B results in a signal at 1C that changes up to six times more often than the original message. That is, the resultant signal is spread across a larger frequency range; as such, the code used to effect this increased frequency range is termed a "spreading-code". The resultant higher frequency sequence illustrated at 1C is communicated to the receiving station, and subjected to noise and interference from other transmitters, and is received at the receiving station in a distorted form. Not illustrated, the sequence at 1C is typically modulated up to a higher frequency for transmission, then demodulated back, or down-converted, to the baseband frequency of the sequence at 1C. This received distorted baseband signal corresponding to the encoded message at 1C is illustrated at 1D.

At the receiver, the received signal at 1D is decoded by modulating it with the same code that was used to create the encoded signal, as illustrated at line 1E. As can be seen, decoding sequence at line 1E is identical, in value and phase, to the encoding sequence at line 1B. In this decoding, a logic value of zero in the code results in an output that is identical to the received signal, and a logic value of one in the code results in an output that is an inverse of the received signal. The decoded signal is illustrated at line 1F. As can be seen at line 1F, the regions of the decoded signal corresponding to a message bit value of "zero" have an overall signal level that is substantially lower than the regions of the decoded signal corresponding to the message bit value of "one". That is, each segment of the message bit that was inverted by a "one" in the encoding sequence (1B) is inverted again by a corresponding "one" in the decoding sequence (1E). A decoder that accumulates the energy content contained in each bit region would demonstrate a substantial negative value corresponding to each "zero" message bit, and a substantial positive value corresponding to each "one" message bit.

As discussed further below with regard to FIGS. 3 and 4, if the encoding sequence at 1B or the decoding sequence at 1E differ, either in value or in phase, the resultant signal at 1F will exhibit erroneous "positive" energy content segments in the regions corresponding to "zero" message bits, and erroneous "negative" energy content segments in the regions corresponding to "lone" message bits. Because of this non-coherence, the energy content of each segment will tend to average out to zero, rather than exhibiting a strong "positive" or "negative" bias.

Figure 2:
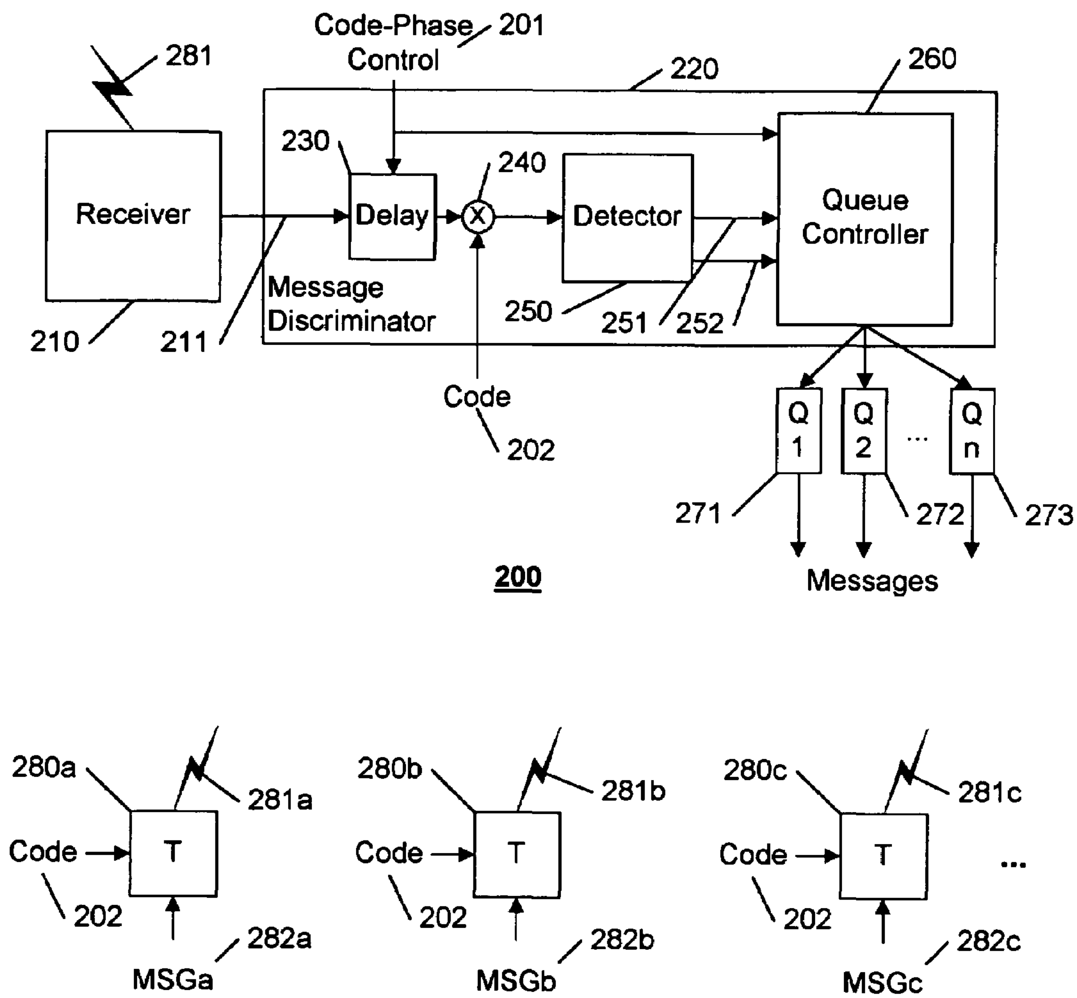
FIG. 2 illustrates an example block diagram for a communications system in accordance with this invention.

FIG. 2 illustrates an example block diagram of a communications system 200 in accordance with this invention. The communications system 200 includes a plurality of transmitters 280*a*–280*c*, a receiver 210, and a message discriminator 220. The transmitters 280*a–c* each provide a transmit signal 281*a–c* comprising a message 282*a–c* that is encoded using a spreading-code 202. Each transmitter 280*a–c* is substantially autonomous, and each transmitter 280*a–c* uses the same encoding and communications parameters, including the same spreading-code 202, and the same modulation technique to provide the transmit signal 281*a–c* over the same communications channel. These transmit signals 281*a–c* form a composite signal 281 within this common communications channel.

In this example embodiment, the receiver 210 receives the composite signal 281, demodulates the composite signal 281, and provides the message discriminator 220 with a down-converted composite signal 211 at the baseband of the encoded transmitted messages. A delay device 230 gathers a portion of the composite signal 211, the starting point of the portion defining the code-phase of the portion relative to the receiver's decoding code 202, which is the same code that is used by each of the transmitters 280*a–c*. If two or more transmitters 280*a–c* transmit at this same code-phase when this code-phase portion is selected, a collision results and this code-phase portion will not be decodable. If only one of the transmitters 280_a–c_ is transmitting at this code-phase when the portion of the message corresponding to this code-phase is selected, the transmitted message 282_a–c_ will be decodable at this code-phase, as discussed with regard to FIG. 1.

Disclosed in the U.S. Pat. Nos. 6,128,469, 6,317,029, and 6,396,819, referenced above, there are a number of applications that include the communication of relatively short and non-critical messages from a plurality of transmitters, via satellite. The satellite preferably includes a transceiver that receives a composite signal containing the messages from the transmitters, and transmits the composite to a receiver at a ground station. The communications system 200 is particularly well suited for these applications, because a single receiver 210 at the ground station can be used to process the asynchronous communications of a large number of identical transmitters. A typical code 202 includes a sequence of over a thousand bits, thereby forming over a thousand code-phases for each bit of a message, and thus the likelihood of two infrequently transmitting devices transmitting at exactly the same code-phase at the same time is slight. Because the messages are non-critical, the loss of messages because of this possibility of an exact phase coincidence is acceptable. For example, one application includes the sensing of moisture content over a vast geographic area. Collectively, this information is useful and significant, but the intermittent loss of reports from individual collectors would not be significant. Because the odds are in favor of subsequent or prior reports from these collectors being transmitted without collision, and the rate of change of information content from these collectors can be expected to be low, the loss of individual reports has an insignificant effect on the collective information.

At each code-phase, as controlled by the code-phase control 201, one code length of the down-converted composite 211 from the delay element 230 is decoded by the code 202, via the decoder 240. In a preferred embodiment, the delay element 230 is a digital device that samples the down-converted composite 211; alternatively, the receiver 210 may provide the sampled value of the down-converted composite 211 directly.

Figure 3:
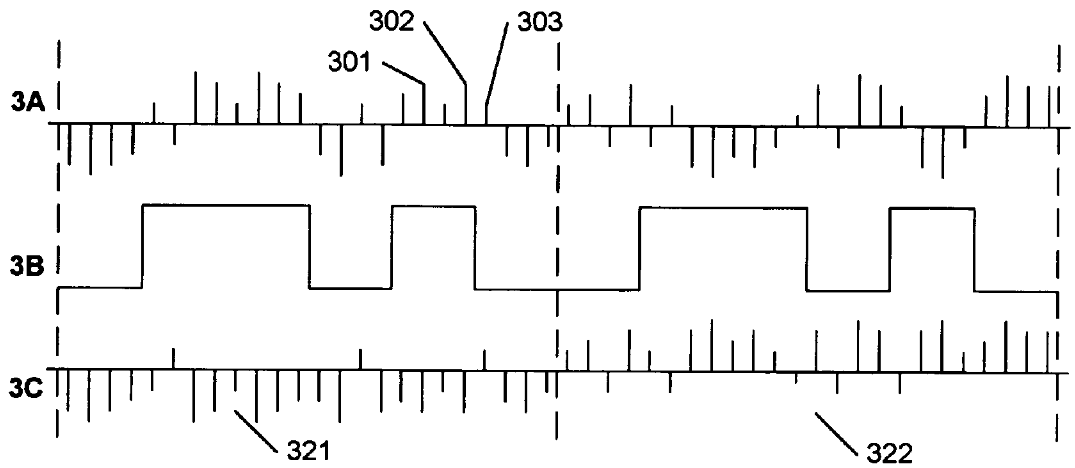
FIG. 3 illustrates an example timing diagram corresponding to a decoding of samples in accordance with this invention.

FIG. 3 illustrates an example timing diagram corresponding to a decoding of samples, illustrated at line 3A, in accordance with this invention. For ease of understanding, two cycles of the example 011010 decoding code 202 is illustrated at line 3B, although as stated above, the delay element 230 in the example embodiment of FIG. 2 provides one code length of the composite 211 to the decoder 240. Line 3C illustrates the decoded values, corresponding to the inversion of the received samples at Line 3A for each code bit value of "one", and a non-inversion of the received samples at Line 3A for each code bit value of "zero". As can be seen, the first group 321 of samples demonstrates a strong negative bias, indicative of an encoded message bit value of "zero", and the second group 322 of samples demonstrates a strong positive bias, indicative of an encoded message bit value of "one".

Figure 4:
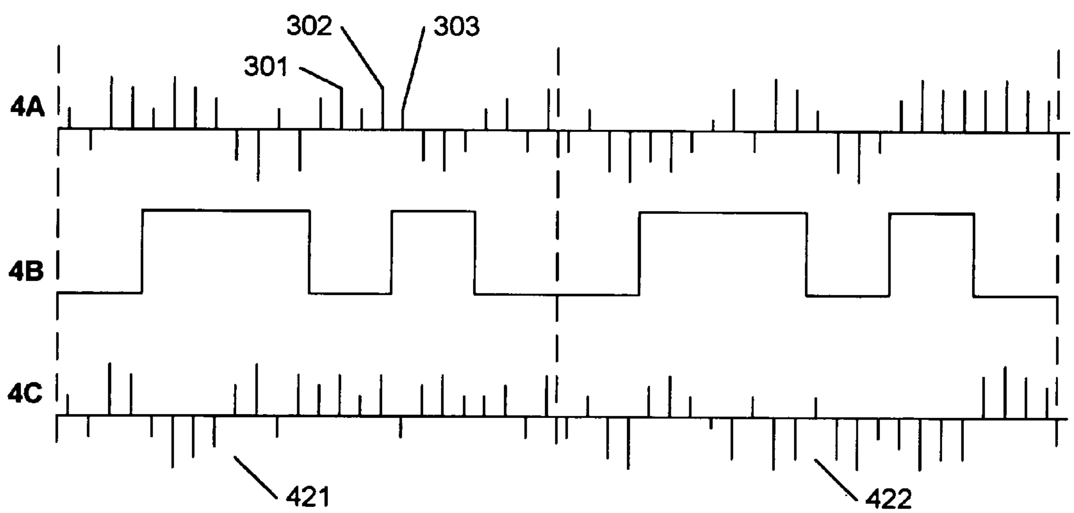
FIG. 4 illustrates an example timing diagram corresponding to a decoding of the samples at a different code-phase than the decoding of FIG. 3.

FIG. 4 illustrates an example timing diagram corresponding to a decoding of the samples at a different code-phase than the decoding of FIG. 3. Line 4A corresponds to the samples of Line 3A, shifted by one code-phase. That is, for example, the samples 301, 302 at Line 3A appear at Line 4A left-shifted by one code-phase, a code-phase corresponding to one bit of the decoding code at Line 3B (and repeated for convenience at Line 4B). As can be seen, the decoded groups of signals 421, 422 on Line 4C do not exhibit the strong negative and positive biases of the decoded groups of signals 321, 322 of Line 3C. The combination of both positive and negative samples in each group 421, 422 have the effect of equalizing the energy content within each group. By comparing the bias of the decoded signal to a threshold value, a determination can be made as to whether the sample of the composite signal at a particular code-phase corresponds to a transmitter that is in-phase with the particular code-phase (FIG. 3), or not (FIG. 4). Note that traditional pseudo-noise codes of thousands of bits, by their very nature, exhibit a more substantial elimination of bias when the code-phases of the transmitter and receiver differ.

Returning to FIG. 2, the detector 250 notifies a queue controller 260 when an in-phase message element is detected, via signal 251, and provides the queue controller 260 with the decoded "zero" or "one" message value, based on the bias or energy content of the decoded message element. The queue controller 260 also receives the code-phase control signal 201 that identifies the code-phase of this in-phase message element. The queue controller 260 provides the decoded message value to a select one of a plurality of queues 271, 272, etc., each queue being associated with each code-phase at which an in-phase signal is found.

Figure 5:
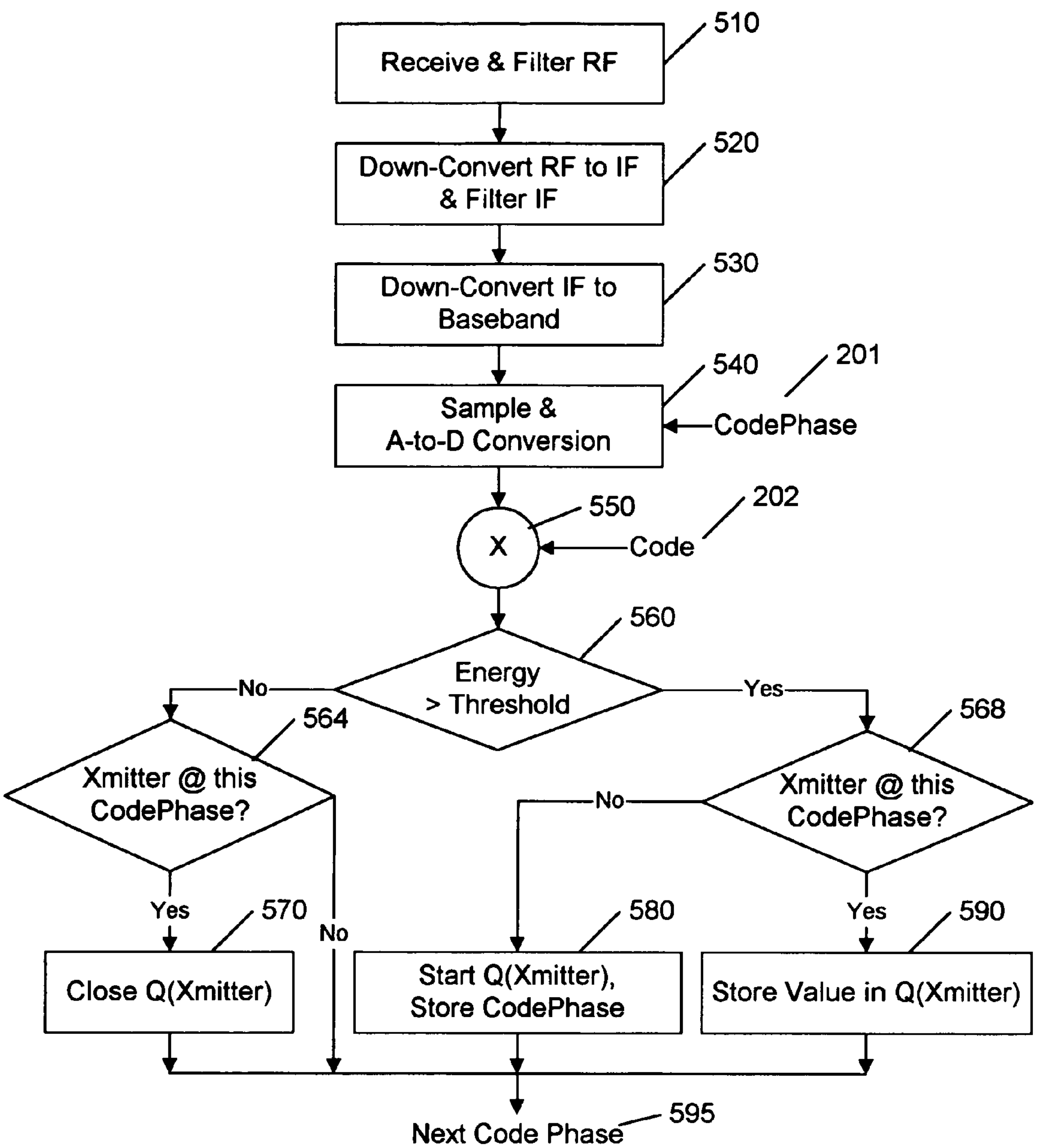
FIG. 5 illustrates a flow diagram for a communications system in accordance with this invention.

FIG. 5 illustrates a flow diagram for a communications system in accordance with this invention, including an example flow corresponding to the operation of a preferred queue controller 260. At 510, the composite signal is received, typically at a relative high radio frequency (RF), and filtered to limit the bandwidth of the composite signal. At 520, this composite signal is down-converted to an intermediate, lower, intermediate frequency (IF) that facilitates further filtering to reduce the noise component of the composite signal. At 530, this composite signal is further down-converted to the baseband of the message signal, corresponding to the example signal illustrated at line 1D of FIG. 1. At 540, the baseband signal is sampled to provide a message element corresponding to each code-phase 201, as discussed above with regard to the delay element 230 of FIG. 2. At 550, the sampled message element is decoded using the code 202. If the energy content of the decoded message element is above a threshold value, at 560, this signifies that an in-phase message element has been received. If this code-phase has not yet been allocated to a transmitter queue, at 568, this in-phase message element is assumed to correspond to the start of a new message from a transmitter. In this case, at 580, a queue is allocated to this transmitter and code-phase for collecting the message elements that form the message from this transmitter at this code-phase. In this manner, when the next in-phase message element is detected at this code-phase, via 560–568, the value of the next message element is appended to the queue allocated to this transmission, at 590. If, at 560, the coherent energy associated with the message element is not above the threshold, this signifies an absence of an in-phase message element at this code-phase. If, at 564, a transmitter has been allocated a queue corresponding to this code-phase, the absence of an in-phase message element signifies the end of the message from the transmitter at this code-phase, and the allocated queue for this transmission is closed, at 570. Not illustrated, the closing of a queue initiates a message-notification process, wherein the contents of the queue are provided to a subsequent processor as a received message. After completion of the actions at either of the blocks 570, 580, 590, or if, at 564, a queue had not been allocated to this code-phase, the process continues, at 595, by processing a message element corresponding to the next code-phase.

As thus far described, the communications system 200 dynamically scans the communications channel for message elements at each code-phase of a given spreading code, and forms received messages corresponding to the message elements received at each code-phase. Although the use of the baseband signal to create each message element allows for a relatively simple energy or bias thresholding technique for determining whether a given message segment corresponds to an in-phase message element, the use of the baseband signal is sensitive to variations in transmit and receive frequencies. Oscillators are available that are accurate to a few parts in a million, and thus maintaining a substantially equivalent frequency at the code-phase level, for a code duration of a few thousand bits, is relatively straightforward. However, if the composite signal is communicated at a transmit frequency in the gigahertz range, a drift of one part per million can result in a baseband difference in the kilohertz range.

Figure 6:
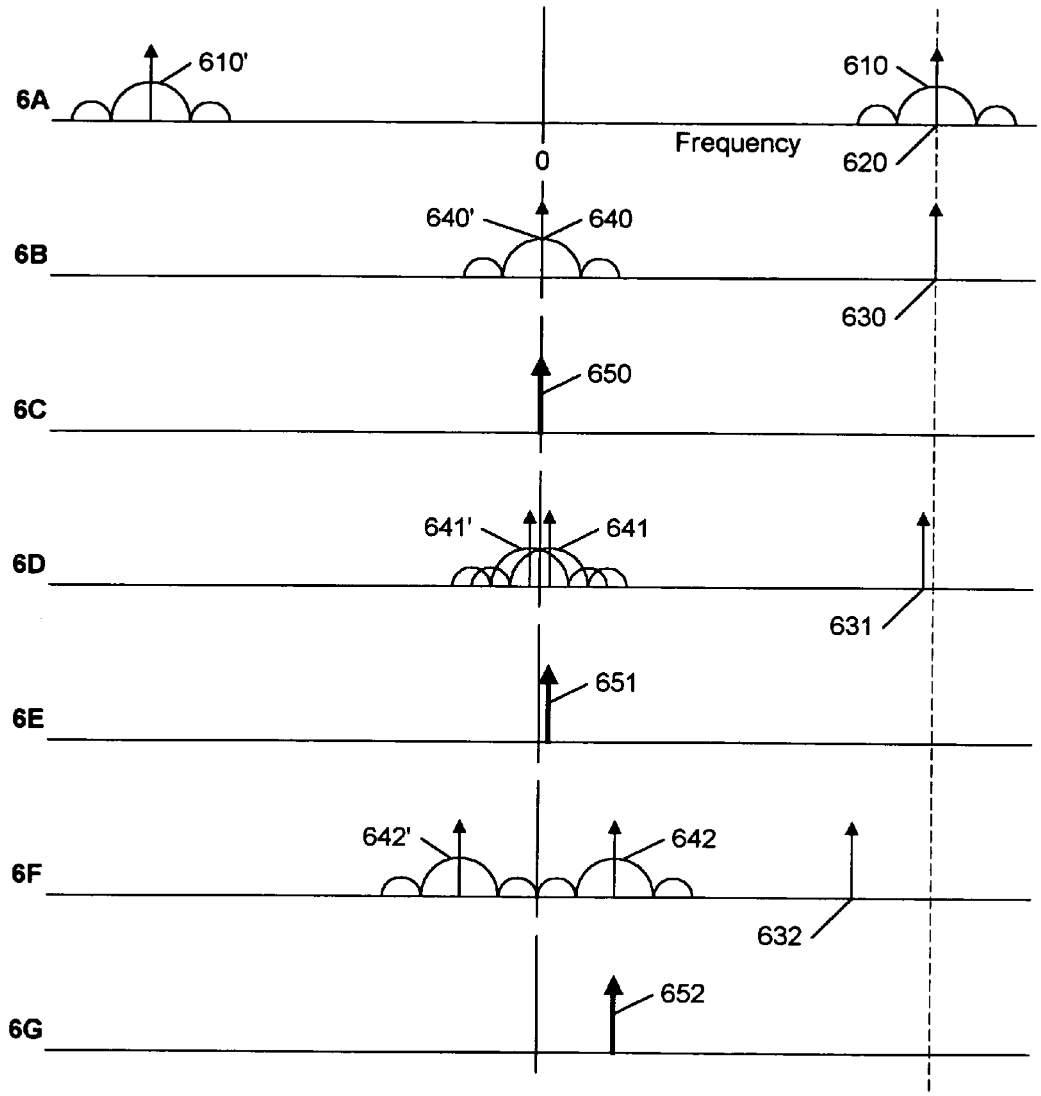
FIG. 6 illustrates example frequency domain diagrams for variations between transmit and receive frequencies, and alternative downconversion techniques in accordance with this invention.

FIG. 6 illustrates example frequency domain diagrams for various combinations of transmit and receive frequencies. Line 6A illustrates a frequency diagram for a spread spectrum signal 610 at an intermediate frequency (IF) 620, such as produced by the block 520 in FIG. 5. Also illustrated at line 6A is the corresponding "negative frequency" component 610'. The intermediate frequency (IF) 620 is a down-conversion of the received signal from the transmitter, and is dependent upon the transmitter's transmission frequency, because the receiver, and hence the down-conversion, is independent of any particular transmitter. Line 6B illustrates a down-conversion of the signal 610 based on a receiver down-conversion frequency 630, which is also independent of the transmitter that provides the signal 610. If the receiver down-conversion frequency 630 corresponds to the transmitter-dependent IF 620, the signal 610 is down-converted such that it is centered precisely at f=0, and the signal 610' is also down-converted (in the negative-frequency sense) to be centered precisely at f=0. This combined signal is illustrated on line 6B as coincident envelopes 640, 640'. When a decoding code that corresponds, in value and phase, to the encoding code that produced the received signal is applied to the envelope 640, a single energy component 650 is produced at the center of the envelope. This single energy component 650 corresponds to the above described DC (f=0) energy component that is produced when an in-phase message element is decoded; its phase (positive or negative) corresponds to the message element value.

Line 6D illustrates a down-conversion frequency 631 that is not coincident with the transmitter-dependent IF 620. For ease of understanding, the difference between the frequencies 631 and 620 is exaggerated and not illustrated to scale. Typically, the intermediate frequency is in the range of tens of megahertz, and the maximum difference between frequencies is in the range of kilohertz. As illustrated on line 6D, this difference results in the signals 610 and 610' being down-converted to +/− the difference frequency, rather than to a frequency of zero (DC), as illustrated at 641, 641'. The mis-match of envelopes 641, 641' introduces a distortion (aliasing) to the positive frequency envelope. When an in-phase decoding is performed on the composite of envelopes 641, 641', a single energy component 651 is produced substantially at the center of this envelope, which is not at the zero (DC) frequency, as illustrated at line 6E. Without aliasing, this component 651 would be at the center of envelope 641, at the difference frequency; the actual frequency of this component 651 will be dependent upon the degree of aliasing. Because this component 651 is not at the zero (DC) frequency, an embodiment that uses the DC energy level to determine whether an in-phase message element is decoded will not operate properly. Consider the transmission of a message comprising a continuous sequence of "ones". A difference frequency of 0 Hertz will produce a substantially constant positive DC level at the output of the decoder 240 of FIG. 2 each time the corresponding code-phase is used. A difference frequency of 100 Hertz, on the other hand, will produce a continually changing value (at or near 100 Hertz) at the output of the decoder 240 of FIG. 2 each time the corresponding code-phase is applied. This is particularly problematic when the changing value approaches and traverses the zero-level at each cycle, because this decreased level falls below the threshold value that is used to determine whether an in-phase message-element is being received.

Line 6F illustrates a down-conversion frequency 632 that is substantially different from the transmitter-dependent IF 620. In a preferred embodiment of this invention, the down-conversion frequency 632 is selected so as to down-convert the signals 610 and 610' to as low a frequency as possible, i.e. near baseband, without introducing significant aliasing. As illustrated in line 6F, frequency 632 in this example is selected so that the down-converted envelopes 642, 642' are non-overlapping, although some overlapping may be tolerable.

In an example embodiment, the intermediate frequency is nominally 21.4 MHz, the center lobe of the envelope 610 is 2.5 MHz wide, each of the side lobes is 1.25 MHz wide, and the maximum difference frequency is +/− 7.5 kHz. In this embodiment, the down-conversion frequency is selected to be 18.9 MHz, so that the entire main lobe of the down-converted envelope is near-baseband in the positive frequency domain, nominally centered at 2.5 MHz. Because of frequency variances, some aliasing may produced by the minor lobe of the down-shifted negative frequency envelope 642', but is insignificant, because the energy content of the minor lobe is substantially less than the energy content of the major lobe. This down-converting to near-baseband, albeit with some aliasing, allows a sampling of the major lobe at 10 MHz, which is well within the bounds of available technology. Alternatively, the down-converted envelope can be positioned above 2.5 MHz, to eliminate the aliasing that may be caused by frequency variances. As will be evident to one of ordinary skill in the art, a different encoding scheme having a different characteristic envelope 610 can be decoded using an appropriate down-conversion to locate the down-converted envelope near-baseband with minimal aliasing. That is, a narrower bandwidth envelope can be down-converted closer to baseband than a wider bandwidth envelope.

When a corresponding in-phase decoding code is applied to the envelope 642, a single energy component 652 is produced, centered on the envelope 642. In the example embodiment detailed above, this component will be produced at 2.5 MHz +/− 7.5 kHz. In a preferred embodiment, a fast Fourier transform (FFT) is used to determine whether such a component is present at the output of the decoder 240 of FIG. 2. As is known in the art, an FFT provides a magnitude and phase of determined energy components. If the message segment being evaluated is not in-phase with the decoding code, and the decoding code is a proper pseudo-noise code, the FFT will not detect a significant energy component within the search range. If the message segment is in phase with the decoding code, the FFT will report an energy component having a substantial magnitude.

Note that because the energy component of interest is known to lie within +/− 7.5 kHz, the FFT in a preferred embodiment is "pruned" so that it includes only those nodes that affect the determination of energy components within this band.

Because the difference between the down-conversion frequency 632 and the transmitter-dependent IF 620 will rarely be an exact integer number of Hertz, the fractional part of the difference frequency will be exhibited as a continually changing phase each time the in-phase code is applied to the decoder 240. For ease of reference, this phase is distinguished from the code-phase by the term "bit-phase", corresponding to the phase of the nominal 2.5 MHz oscillation comprising the bits of the encoded message segment. For example, if the fractional part of the difference frequency is 0.2, the reported phase for each decoded message element of the same logic value will advance by 72 degrees (0.2*360). If a subsequent decoded message element is of the opposite logic value, the reported phase for this subsequent element will advance by 72 degrees plus the phase change, 180 degrees, associated with this change of logic value.

Figure 7:
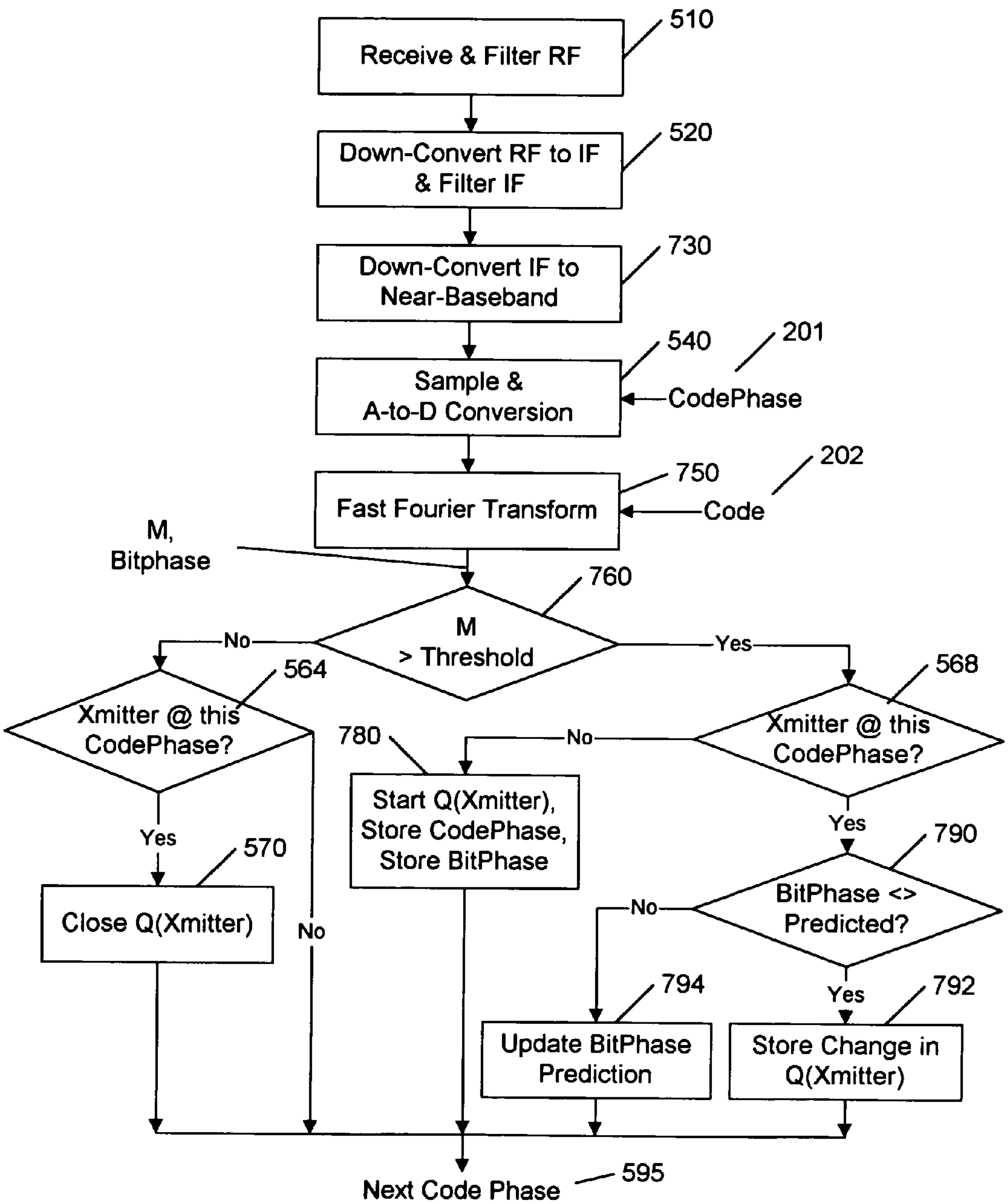
FIG. 7 illustrates an example flow diagram for a communications system that facilitates the decoding of messages from transmitters that are operating at frequencies than differ from the receiver frequency, in accordance with this invention.

FIG. 7 illustrates an example flow diagram for a communications system that facilitates the decoding of messages from transmitters that are operating at different frequencies than the receiver, in accordance with this invention. Blocks in this diagram having similar functions to those described in FIG. 5 are identified using the same reference numerals. Blocks 510 and 520 in FIG. 7 down-convert and filter the received composite signal to form an envelope similar to envelope 610 in FIG. 6. At 730, the envelope is down-converted to near baseband of the encoded signal, similar to envelope 642 of FIG. 6. A message segment corresponding to the current code-phase 201 is sampled and digitized for subsequent processing, at 540. At 750, this near-baseband digital signal is decoded using a modified FFT. Optionally, a conventional decoder 550 can be utilized, followed by a conventional FFT. In the modified FFT of 750, the input to the FFT processing elements are suitably inverted or not inverted, corresponding to the decoding code 202. As mentioned above, the nodes of the modified FFT are also trimmed to remove those that do not affect the determination of energy components within the bandwidth corresponding to the expected variance among transmit frequencies relative to the receiver. The FFT of 750 provides a magnitude M and a bit-phase of detected energy components in the decoded message segment within the search bandwidth. If the magnitude M is greater than a threshold value, at 760, this signifies that an in-sync message element is present at this code-phase. If the code-phase has an allocated queue, at 568, the bit-phase of the detected energy component is compared to the predicted bitphase, at 790, to determine whether the phase of the logic value of the message element has changed.

As discussed above, the predicted bitphase is based on the rate of change of prior detected bitphases. In a preferred embodiment, the protocol associated with the communicated messages includes a repetitive transmission of a known message value to establish this rate of change and to determine an initial logic value associated with this message queue. If the bitphase is substantially different from the predicted bitphase, indicating a change in logic value, the changed value is stored in the queue, at 792. If the bitphase is not significantly different than expected, the parameters used to predict the bitphase are updated based on this detected bitphase, at 794.

If, at 568, the code-phase has not yet been associated with a message queue, a message queue is initiated, at 780. If, at 760, the detected magnitude M from the FFT is not greater than the threshold, indicating the absence of an in-phase message element, the queue that is associated with this code-phase, if any, is closed, via 564, 570.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the above presentation, each message bit is encoded using a single cycle of the encoding code. Redundancy can be provided by encoding each message bit using multiple cycles of the encoding code. In this manner, if collisions occur on individual message elements, the redundancy can be used to "fill in the blanks". In this embodiment, the block 564 is suitably modified so that only if a long series of elements below the threshold are received is the queue closed; otherwise, the queue value remains the same until a non-predicted phase value is decoded, at 590–592. In like manner, the messages can be formed using conventional error-correcting codes, so that lost bits can be recovered. Similarly, to ease the decoding task, messages can be formed using a phase-independent encoding (e.g. byte values 01100101 and 10011010 decode to the same message character).

Although the invention has been disclosed using a single communications channel and a single DSSS code, it will be evident to one of ordinary skill in the art that multiple codes can be provided to expand the number of transmitters supported by the communications system. That is, for example, multiple decoders 240 can be provided, each assigned to a particular code. In this embodiment, to reduce the likelihood of collisions, the codes are randomly distributed among transmitters within a common geographic area. These and other system configuration and optimization features will be evident to one of ordinary skill in the art in view of this disclosure, and are included within the scope of the following claims.

We claim:

1. A communications system for receiving a plurality of messages from a plurality of transmitters, comprising:

a receiver that is configured to receive a composite signal that comprises the plurality of messages from the plurality of transmitters, each message having a transmitter code-phase relative to a code-phase of the receiver, each transmitter code-phase being independent of the code-phase of the receiver, and a message discriminator that is configured to discriminate at least one message from the plurality of messages based on the transmitter code-phase corresponding to the at least one message, wherein the message discriminator comprises:

a delay element, operably coupled to the receiver, that is configured to provide a message sample from the composite signal, the message sample corresponding to a select transmitter code-phase relative to the code-phase of the receiver, a decoder, operably coupled to the delay element, that is configured to decode the message sample based on a receiver code at the code-phase of the receiver, and thereby provide a decoded message sample at the select transmitter code-phase, and a threshold detector, operably coupled to the decoder, that is configured to discriminate the at least one message corresponding to the decoded message sample, based on a composite energy component of the decoded message sample at the select transmitter code-phase.

2. The communications system of claim 1, further comprising at least one queue device that is configured to receive the decoded message sample from the decoder for the at least one message at the select transmitter code-phase.

3. The communications system of claim 1, wherein the receiver code comprises a pseudo-random noise direct-sequence spread-spectrum (DSSS) code.

4. The communications system of claim 1, wherein the receiver includes a downconverter that is configured to provide a downconverted composite signal above a baseband frequency of the plurality of messages, and the decoder includes a Fast Fourier Transform (FFT) element that is configured to determine the composite energy component.

5. The communications system of claim 4, wherein the Fast Fourier Transform (FFT) element comprises a number of nodes that propagate values to provide the determination of the composite energy component, and the number of nodes is dependent upon a bandwidth corresponding to a variance of transmit frequencies associated with the plurality of transmitters.

6. The communications system of claim 4, wherein the Fast Fourier Transform (FFT) element is also configured to determine a bit-phase corresponding to the decoded message sample, and a content of the at least one message is based upon the bit-phase corresponding to the decoded message sample.

7. The communications system of claim 6, wherein the content of the at least one message is further based on a predicted bit-phase that is based on a plurality of bit-phases of prior message samples.

8. The communications system of claim 1, further comprising a satellite that is configured to receive the plurality of messages from the plurality of transmitters, and to provide therefrom the composite signal to the receiver.

9. The communications system of claim 1, further comprising:

at least one other decoder, operably coupled to the delay element, that is configured to decode the message sample based on an at least one other receiver code at the code-phase of the receiver, and thereby provide at least one other decoded message sample at the select transmitter code-phase.

10. A method of communication comprising:

receiving a composite signal that comprises a plurality of messages from a plurality of transmitters, each message having a transmitter code-phase relative to a code-phase of the receiver, each transmitter code-phase being independent of the code-phase of the receiver, and discriminating at least one message from the plurality of messages based on the transmitter code-phase corresponding to the at least one message, wherein discriminating the at least one message includes:

sampling the composite signal to provide a message sample, the message sample corresponding to a select transmitter code-phase relative to the code-phase of the receiver, decoding the message sample based on a receiver code at the code-phase of the receiver to provide a decoded message sample at the select transmitter code-phase, and determining an energy component of the decoded message sample at the select transmitter code-phase, comparing the energy component to a threshold value to discriminate the at least one message corresponding to the decoded message sample.

11. The method of claim 10, further comprising:

determining a decoded message value from the decoded message sample, and queuing the decoded message sample in a queue that is associated with the select transmitter code-phase to form the at least one message.

12. The method of claim 10, wherein the receiver code comprises a pseudo-random noise direct sequence spread-spectrum (DSSS) code.

13. The method of claim 10, wherein receiving the composite signal includes downconverting the composite signal to provide a downconverted composite signal above a baseband frequency of the plurality of messages, and transforming the downconverted composite signal via a Fourier transform to determine the composite energy component.

14. The method of claim 13, wherein transforming the downconverted composite signal via the Fourier transform also provides a bit-phase corresponding to the decoded message sample, and determining a decoded message value based upon the bit-phase corresponding to the decoded message sample.

15. The method of claim 14, wherein the content of the at least one message is further based on a predicted bit-phase that is based on a plurality of bit-phases of prior message samples.

16. The method of claim 15, further comprising receiving the plurality of messages from the plurality of transmitters via a satellite and providing thereby the composite signal to the receiver.

* * * * *